June 10, 1969  H. F. HARTZELL, JR  3,448,868

MATERIAL HANDLING APPARATUS

Filed Jan. 17, 1968

INVENTOR.
HARRY F. HARTZELL, JR.
BY Sherman H Barber
his Attorney

June 10, 1969     H. F. HARTZELL, JR     3,448,868
MATERIAL HANDLING APPARATUS
Filed Jan. 17, 1968     Sheet 2 of 3
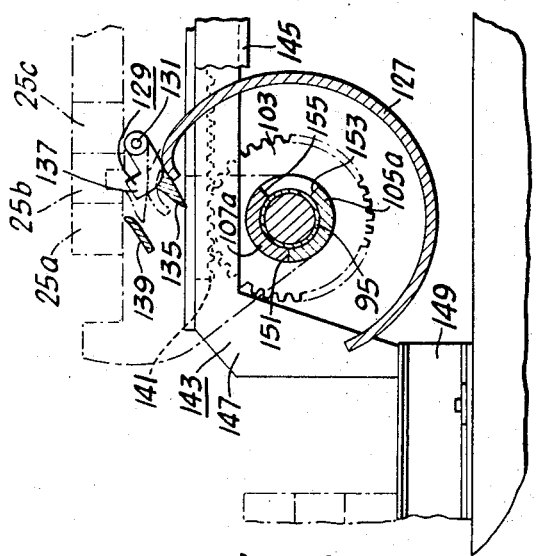
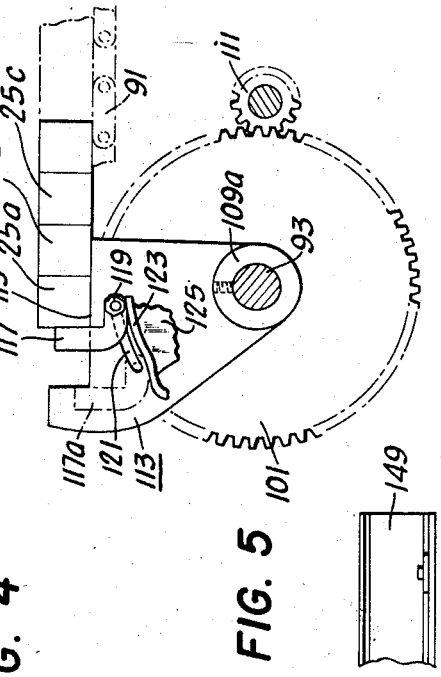
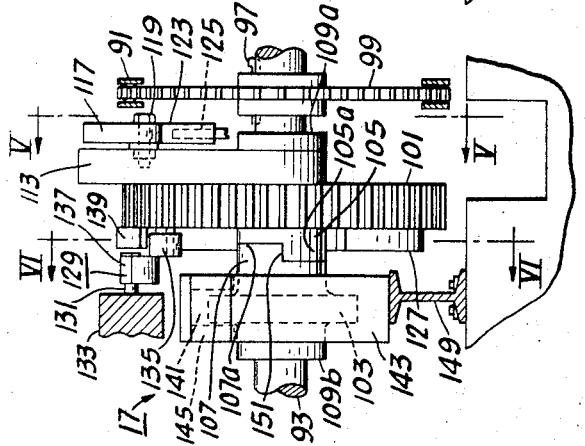
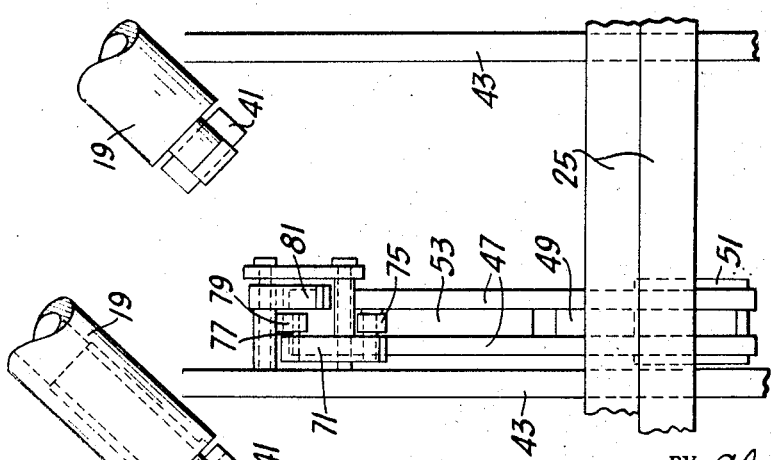
INVENTOR.
HARRY F. HARTZELL, JR.
BY Sherman H Barber
his Attorney

United States Patent Office 3,448,868
Patented June 10, 1969

3,448,868
MATERIAL HANDLING APPARATUS
Harry F. Hartzell, Jr., Allison Park, Pa., assignor to
Koppers Company, Inc., a corporation of Delaware
Filed Jan. 17, 1968, Ser. No. 698,536
Int. Cl. B65g 57/00, 47/00; B25j 3/00
U.S. Cl. 214—6                                      14 Claims

ABSTRACT OF THE DISCLOSURE

Apparatus for handling stackable products includes a transfer table having angularly positioned rotatable rollers that direct the products toward a dispensing apparatus. The products are dispensed one at a time onto chains that move the products to a stacker. The stacker has a head that accepts one or more products simultaneously and moves them through an angle of 90°, depositing the products on skid rails. A pusher ram actuated by further rotation of the stacker head then moves the stacked products laterally; as the stacker head returns to original position the pusher ram is retracted.

Background of the invention

The orderly handling of elongate stackable products such as metal bars, rods, slabs and billets, or wooden boards, and other pieces of lumber, for example, plays a large part in the efficiency of a business dealing in such products.

In the steel industry particularly, wherein continuous lengths of a strand of metal are produced and billets are periodically cut from the strands, there is the problem of arranging and stacking the billets, after they are produced at a strand cut-off station, in an efficient and orderly manner.

Heretofore, it has been customary to move the billets lengthwise down a run-out table and then move them sidewise to an area where they are handled by the usual cranes and other types of auxiliary power equipment. However, such procedures are time consuming, costly and inefficient. In contrast, the apparatus of the present invention effectively handles elongate products, such as are mentioned herein, with ease and efficient dispatch, and with a considerable saving in time and expense.

Summary of the invention

Apparatus for handling stackable units comprises a plurality of powered rollers that move the units toward a dispensing apparatus that regulates the number of units moving onto powered chains. The units move on the chains to a stacker device comprising a stacker head that rotates through an angle from a first position to a second position where the units are deposited on skid rails. The stacker head continues to rotate to a third position during which period a ram engages and pushes the stacked units along the skid rails. The stacker head reverses and after it passes the second position, the ram retracts. When the stacker head returns to the first position, the cycle is repeated.

For a further understanding of the invention, and for advantages and features thereof, reference may be made to the following description in conjunction with the accompanying drawings which show, for the purposes of exemplification, a preferred embodiment of the invention.

Brief description of the drawings

In the drawings:
FIG. 2 is a plan view of a portion of the apparatus of FIG. 1;
FIG. 4 is a view along line IV—IV of FIG. 1;
FIG. 5 is a view along line V—V of FIG. 4;
FIG. 6 is a view along line VI—VI of FIG. 4.

Detailed description

Figure 1:
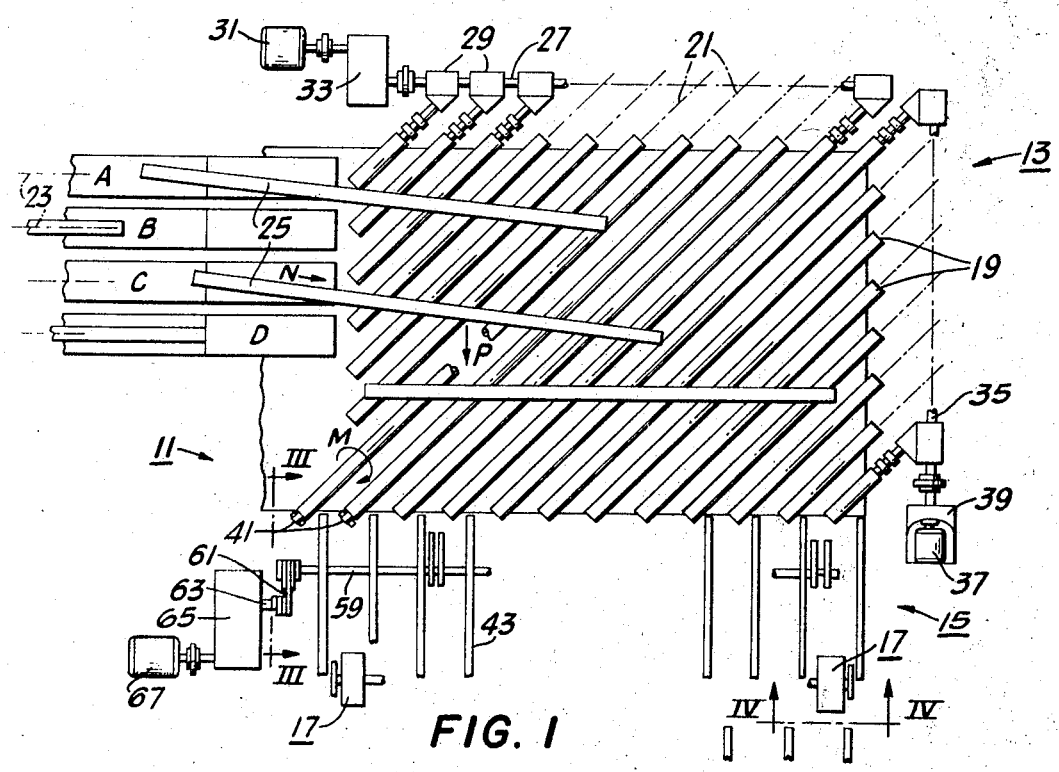
FIG. 1 is a plan view of apparatus in accordance with the invention.

Referring to FIG. 1, the apparatus 11 comprises a first product transfer arrangement of powered rollers 13, a second product transfer or dispensing arrangement 15, and a product stacker apparatus 17.

First product transfer apparatus

The first product transfer apparatus 13 comprises a plurality of rollers 19 having generally parallel, spaced apart axes of rotation 21. The axes of rotation 21 are disposed at an angle that is less than 90° with respect to the axes 23 of paths A–D, along which stackable products, such as billets 25 or slabs for example, move from left to right as viewed in FIG. 1. Such billets 25 are cut from strands produced in a continuous casting machine (not shown).

One end of each roller 19 of a group is operatively connected to a drive shaft 27 through a conventional angle gear box 29, or the like, and the drive shaft 27 is powered by an electric motor 31 acting through a conventional speed reducer 33. Each roller 19 of another group is similarly driven from a drive shaft 35 that is powered by an electric motor 37 acting through a conventional speed reducer 39.

Each roller 19 is suitably journaled adjacent its respective speed reducer 33 or 39, and also at the opposite end in a bearing 41 (some of which are not shown for simplification of the drawing).

The rollers 19 are so driven that they all rotate in the direction of the arrow M, wherefore a billet 25 moving onto the rotating rollers is skewed with respect to the axes 23 and is simultaneously moved in the direction of the arrow N, onto the first product transfer apparatus 13 and also in the direction of the arrow P, towards the second product transfer arrangement 15.

Second product transfer apparatus

Figure 3:
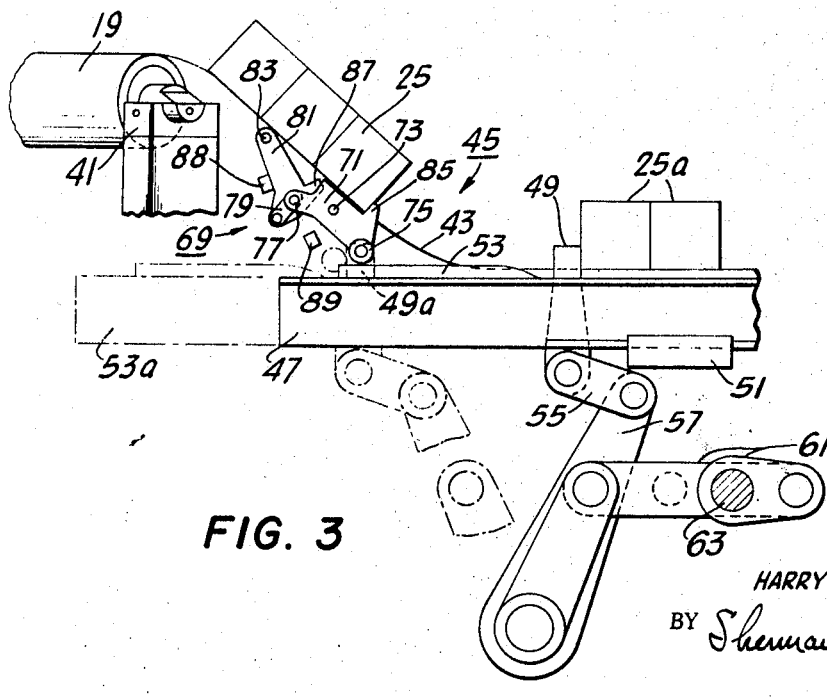
FIG. 3 is a view along line III—III of FIG. 1.

FIGS. 2 and 3 illustrate apparatus for holding and dispensing billets 25, or slabs as the case may be, which are then moved by the mechanism of FIGS. 2 and 3 onto the product stacker apparatus 17.

The apparatus of FIGS. 2 and 3 comprises a plurality of skid rails 43 that are fixed to any suitable supporting structure located adjacent the terminal end bearing 41 of each roller 19.

Adjacent one of two or more spaced apart skid rails 43 is a mechanism 45 for holding, releasing, and pushing the billets individually toward the product stacker apparatus 17.

The mechanism 45 comprises a pair of horizontal guideways 47 that are suitably fixed to the adjacent skid rail 43. Between the guideways 47, there is a pusher-dog 49 that is equipped with a slide block 51 that engages the guideways, whereby the pusher-dog 49 is reciprocable horizontally along the guideways 47.

Between the pusher dog 49 and the roller end which is bearing 41 there is an elongate cam 53 which is slidably mounted to the guideways 47 and connected to and reciprocates simultaneously with the pusher dog 49.

The lower end of the pusher dog 49 is pivotally connected to a short link 55 which also pivotally connects to the free end of an arm 57 that is fixed, as by a key or in other suitable manner, to a powered drive shaft 59. Shaft 59 is driven by a crank arrangement 61 operatively connected to the output shaft 63 of a speed reducer 65 that is driven by a motor 67 (FIG. 1).

To the side of the skid rail 43, there is mounted a cam-dog arrangement 69. A first dog 71 is pivotally mounted at 73 to the skid rail 43 and supports a cam-follower roller 75 at its lower end. Opposite the cam-follower roller 75 is a pivot 77 pivotally connecting a link 79 to a second dog 81 that is also pivotally mounted at 83 to the skid rail 43.

First dog 71 has a finger or ear 85 that projects upward in the position shown in FIG. 3, and engages the lower edge of a billet 25 sliding down the skid rail 43. Second dog 81 likewise has an upward projecting finger or ear 87 which, in the position shown in FIG. 3, is below the lower edge of the billets 25. The second dog 81 actually bears against a stop 88 fixed to the skid rail in the position shown in FIG. 3. Another similar dog stop 89 is mounted to the skid rail below the first dog 71.

*Product stacker*

The skid rails 43 extend outward from the second product transfer apparatus 15 to the product stacker 17. Associated with each of the skid rails 43 is an endless link chain 91 (FIGS. 4 and 5) on which the billets 25 rest and by means of which the billets are conveyed toward the product stacker 17.

Those skilled in the art will recognize that other types of equipment, such as powered rollers driven by a chain or by gearing, may be used to move the billets 25 along the skid rails, if such equipment is preferred.

The product stacker 17 (FIGS. 4–7d) comprises: a driven shaft 93; a sprocket 99 which is fixed to the shaft as by key 97 and over which the chain 91 passes; and a sleeve 95 that is freely rotatable on the shaft 93 and that is positioned on the shaft by fixable set collars 109a, 109b. A large gear wheel 101 and a rack-drive pinion 103 are press fitted onto the sleeve; the pinion 103 and gear 101 having cooperative hubs 107 and 105 respectively (FIGS. 4 and 6).

The gear wheel 101 is powered by an electric motor driven pinion 111 (FIG. 5), which is reversible under the control of suitable electronic equipment, such as computerized controls 102 (FIG. 8), of a type known to those skilled in the art. Such control equipment may include manual 104 as well as the computerized controls 102. Of course, the pinion 111 may be powered in any other suitable manner, as by hydraulic motor, hydraulic cylinder, and the like if desired.

Suitably fixed to the gear wheel 101 is a stacker head 113 that is shaped about as shown in FIG. 5; the stacker head being also press fitted onto the sleeve 95, which freely rotates on the shaft 93, between the gear wheel 101 and the set collar 109a.

At the beginning of a stacking cycle, the stacker head 113 is positioned where shown in FIG. 5. The stacker head 113 has a flat land surface 115 onto which a plurality of billets 25 are carried by the chain 91.

A billet engaging stop 117 is movably mounted, by an ordinary bolt and nut assembly 119 passing through an arcuate, elongate slot 121, to the stacker head 113. The billet engaging stop 117 engages a cam 123, that is suitably fixed to supporting structure 125 located adjacent the stacker head 113, whereby the billet engaging the dog 117 is maintained in an upright position when the stacker head 113 is in the position shown in FIG. 5 or when the stacker head 113 is within an angle of about 45° from such position. The dotted outline of the billet engaging dog 117a, shown in FIG. 5, is one of the many positions the dog 117 can take when it is desired to vary the number of billets that are handled simultaneously by the stacker, or when billets of different sizes are to be handled. By moving the dog 117 from the solid position shown in FIG. 5 to the dotted position, more land surface 115 is available to support billets 25.

FIG. 6 illustrates an arcuate cam 127 that is fixed to the gear wheel 101, and that engages a billet holding stop 129, pivotally mounted at 131 to supporting structure 133 like the supporting structure 125. The billet holding stop 129 is shaped about as shown in FIGS. 4 and 6, having an outwardly projecting foot portion 135 that engages the cam 127, and an upwardly extending finger portion 137 that engages the front edge of the billet 25.

Another cam 139 is mounted to the gear wheel 101 about where shown in FIG. 6 so as to be engageable with the foot portion 135 of the billet holding stop 129 in a manner described hereinafter.

The rack-drive pinion 103 engages and meshes with a rack portion 141 of a pusher ram 143 slidably mounted to suitable structure 145, so that the pusher ram 143 can reciprocate horizontally as the rack-drive pinion rotates 103.

The pusher ram 143 has a dependent portion or head 147 that is engageable with the billets 25 when they have been stacked on horizontally arranged support rails 149, in a manner described hereinafter.

The cylindrical hub 105 of the gear wheel 101 is partially cut away so that only a portion 105a of the hub overlaps and is engageable with a portion 107a of the cylindrical hub 107 of the rack-drive pinion, as indicated in FIG. 6. Each hub 105a and 107a subtends an angle of 135°.

The apparatus of the invention operates in the following manner.

The first product transfer apparatus, shown in FIG. 1, is first actuated and all of the rollers 19 rotate in the direction of the arrow M. While FIG. 1 illustrates individual gear boxes driving each roller, it should be apparent to those skilled in the art that other well known and much used arrangements, such as sprockets and chains, individual electric motors, hydraulic motors, and the like, may be used if preferred. Further, if desirable, the longer rollers may be suitably supported along their length to prevent undue deflection due to the weight of the heavy billets pressing on the rollers, and deflection due to heat.

In copending application Ser. No. 660,813 filed Aug. 15, 1967, I describe a run-out table that has a plurality of paths A–D along which move billets cut from a continuous cast strand, and that has billet stops that automatically operate to stop and pass billets in accordance with a desired sequence.

The product transfer apparatus 13 of the present invention may be associated with such a run-out table. Then, at timed intervals the aforementioned stops retract and allow the billets 25 to pass onto the first product transfer apparatus 13, sa shown in FIG. 1. When a desired unmber of billets 25 enter the product transfer apparatus 13, the stops referred to above raise and prevent other billets traveling along the same paths from entering the product transfer apparatus until the first billets on the apparatus have moved to the second product transfer apparatus 15, or until the billets are well clear of the discharge end of the billet paths A–D.

The combined angular disposition of the rollers 19 and their rotation speed in the direction of the arrow M, conveys the billets 25 to the right and downward toward the second product transfer apparatus 15, as viewed in FIG. 1.

The billets 25 pass over the lower journaled ends of the rollers and move onto the fixed inclined skid rails 43. The lead billet 25 engages the upraised stop portion of the first dog 71 and is prevented from sliding further down the rails 43. At this particular moment, the pusher dog 49 is in the position shown in FIG. 3, having just pushed a preceding billet 25a into the position there shown. Shaft 63, of course, is rotating and the crank arms 61, 57, and link 55 then move the pusher dog 49 and slidable cam 53 to the left, as viewed in FIG. 3.

When the crank 57 and link 55 reach the dotted outline position, the cam 53 also reaches the dotted outline position 53a and the pusher dog reaches the dotted outline position 49a.

In passing from the position shown by solid lines at the right in FIG. 3, the pusher dog 49 engages the cam follower 75 and urges the first dog 71 to pivot clockwise about pivot 73. Simultaneously, the second dog 81 pivots counterclockwise about pivot 83. When the first dog 71 pivots clockwise, the finger portion 85 disengages from the billet 25 allowing it to gravitate down the rails 43. At the same time, the finger portion 87 of the second dog raises and engages the next succeeding billet to prevent it from gravitating any further.

Then, as the crank 57 commences to return to the position shown in solid lines (FIG. 3) the cam 53 engages the cam follower 75 and the first dog 71 pivots counterclockwise. The second dog 81, at the same time, pivots clockwise and releases the billet it had been holding. Whereupon, the billet slides down the rails 43 until it engages the first dog, now returned to the position shown in FIG. 3. The billet 25 which was released by the first dog, is pushed toward the right by the pusher dog 49 during the return stroke of the crank arm 57.

Thus, the second product transfer apparatus 15 operates cyclically to hold and release billets onto the fixed rails 43. Thereafter the billets are carried by the chains 91 toward the product stacker apparatus 17.

At the commencement of a stacking cycle, the product stacker head 113 is in the position shown in the solid outline in FIG. 5. The billet stop 117 may be positioned where shown, so that only two billets 25a, 25b may be supported on the land surface 115. Billet 25c remains in contact with the chains 91. The billet stop 117 is maintained in the upright, operative position by cam 123, and billet stop 129 is in a retracted inoperative position (FIG. 6), being pivotable in the stacking cycle in a clockwise direction, under the influence of cam 127. The pusher ram 143 is at the moment in operative and is located at the right end of its stroke (FIG. 6). The overlapping hubs 105a and 107a are disposed, with respect to each other as shown in FIG. 6. That is, hubs 105a and 107a abut along a common surface 151; a condition resulting from the operation of the stacker during the previous cycle.

Then, pinion 111 rotates clockwise and turns the large gear wheel 101 in a counterclockwise direction, as viewed in FIG. 5. Immediately, the stacker head 113 also rotates in a counterclockwise direction, as does the hub portion 105a. It will be noticed that a surface 153 of hub portion 105a is angularly spaced 90° apart from a surface 155 of hub portion 107a.

As stacker head 113 rotates counterclockwise, the two billets 25a, 25b follow therealong, and immediately cam 127 pivots the billet holding stop 129 clockwise into the upright position engaging billet 25c, as shown in dotted outline in FIG. 6. In such position, the billet holding stop 129 prevents billet 25c from advancing any further toward the left.

The pivotable billet stop 117 engages the billets 25a, 25b until the stop 117 disengages from the cam 123. Whereupon, the billet stop 117 pivots counterclockwise and releases the billets 25a, 25b, which slide on the land surface 115 until the lead billet 25a engages, and is stopped by, the upraised portion of the stacker head 113.

Figure 7A:
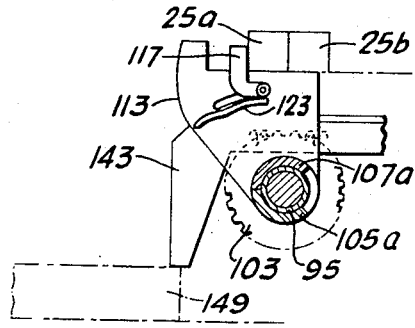
FIGS. 7a, 7b, 7c, and 7d are schematic views that illustrate one phase of the operation of the apparatus.
Figure 7B:
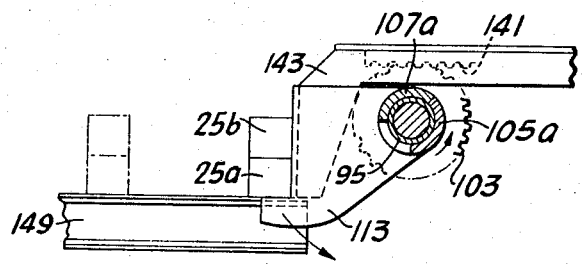

When the stacker head 113 has rotated from the position suggested in FIG. 7a, through an angle of 90°, it will be in the position suggested in FIG. 7b. In such position, the surface 153 of hub 105a now abuts the surface 155 of hub 107a; the billets 25a, 25b at this moment rest on the skid rails 149.

Figure 7C:
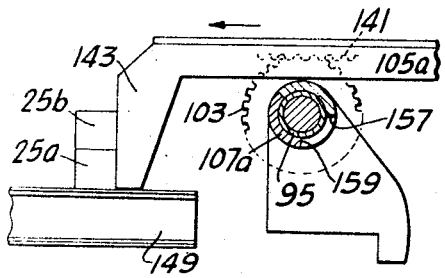

However, the pinion 111 continues to rotate clockwise, thereby rotating the gear 101 and stacker head 113 through a further angle of 90°, or to the position suggested in FIG. 7c. As soon as the stacker head 113 commences rotation beyond the angular position shown in FIG. 7b, the hubs 105a, 107a coact through the abutting surfaces 153, 155 to rotate the rack-drive pinion 103 counterclockwise. This pinion rotation causes the rack 141 and pusher head 143 to move laterally toward the left (as viewed in FIGS. 7b, 7c).

Figure 7D:
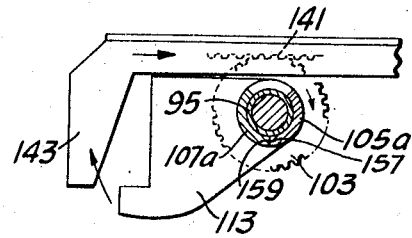

After the stacker head 113 and the pusher head 143 have rotated through an angle of 90° and the pusher head 143 assumes the position indicated in FIG. 7c, the motor or power source driving the pinion 111, stops and reverses, thereby reversing the direction of rotation of the pinion 111; the pinion 111 now rotates counterclockwise. At first, only the stacker head 113 rotates because the contact surface 157 of hub 105a and surface 159 of hub 107a are separated by an angle of 90° through which the hub 105a rotates before contact is made between surfaces 157 and 159. FIG. 7d shows the position of the stacker head 113 when the surfaces 157, 159 abut. Since there is no contact between surfaces 157, 159 during rotation of the hub 105a through the aforementioned angle of 90°, the pusher ram 143 does not retract during this period of time. But, after surfaces 157, 159 abut when the stacker head is at the second position, on its way back to the first position (FIG. 7d), the pusher ram 143 retracts, by moving from left to right as viewed in FIG. 7d. The pinion 111 rotates counterclockwise until the stacker head 113 returns to the position, shown in FIGS. 5 and 7a, which is the initial position. Whereupon, the apparatus is ready to commence another stacking cycle.

Referring to FIG. 6, it will be noted that the cam 127 continually engages the billet holding stop 129, from the time the stacker head 113 first moves in a counterclockwise direction until it has just about returned to its initial position. Just before the stacker head reaches the initial position, however, the cam 127 disengages from the billet holding stop 129, and the stop pivots counterclockwise, allowing other billets to move onto the land surface 115. Simultaneously, the billet stop 117 engages the cam 123 and stands erect again to limit the number of billets on the land surfaces. If, for any reason, the billet holding stop 129 does not pivot counterclockwise as it should, the cam 139 will engage the foot portion 135 of the billet holding stop 129 and urge it to rotate counterclockwise.

Of course, the billet stop 117 may be positioned in different locations so that more than two billets may be accommodated on the land surfaces 115.

Figure 8:
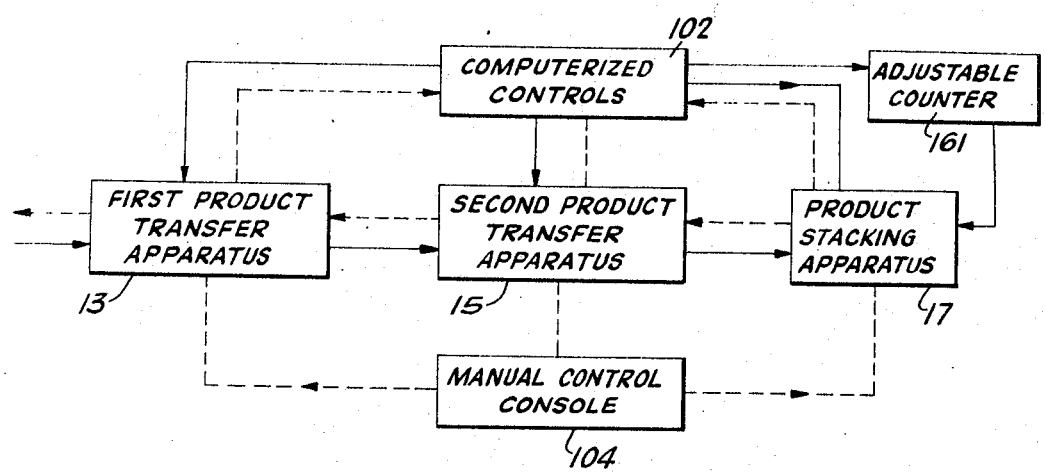
FIGS. 8 is a schematic control diagram for the apparatus of the invention.

Those skilled in the art will appreciate the fact that the usual limit switches and controls, such as are shown in FIG. 8, may be used with the apparatus described herein to make it perform in the manner indicated. For example, an adjustable counter 161, of known design, may be installed in the electrical control circuits so that, after a preselected number of stacking cycles have been made, a signal is given to the control console of the motor driving pinion 111 whereby the stacker head 113 rotates counterclockwise through an arc larger than the normal indexing arc of 90°, so that the pusher head 143 then moves further toward the left. The difference in the strokes of the pusher head creates a temporary gap between groups of stacked billets, thereby permitting a group of the billets to be picked up by conventional other material handling equipment.

While only one product stacker apparatus has been described, those skilled in the art will appreciate the fact that two or more such product stacker apparatus should be used in handling elongate billets, slabs, and the like products. The number used, and the spacing thereof, would be dictated by the type of material, as well as the length of material being handled. Two such stacker apparatus are suggested in FIG. 1.

A feature of the invention is that of the transfer and stacking of products, such elongate slabs or billets, discharged from a multi-strand continuous casting machine, is automatically accomplished in an orderly and efficient manner.

A feature of the invention is that the products are handled and stacked in a rapid manner, whereby the stacked products can be moved more rapidly to another process area, or to a shipping area.

A feature of the invention is that all operations may be coordinated by sophisticated electronic equipment in a central console. But, whenever necessary, the operations may be manually controlled from a central manual control console.

A feature of the invention is that the apparatus is versatile; being adaptable to handle in an efficient and safe manner various products which may be stacked. The invention is not necessarily limited to products of only one kind.

Although the invention has been described herein with a certain degree of particularity, it is understood that the present disclosure has been made only as an example and that the scope of the invention is defined by what is hereinafter claimed.

What is claimed is:

1. Apparatus for handling units of material adaptable for stacking comprising:
   (a) a gear mounted to a shaft for free rotation about the axis of the shaft and having a hub with a portion surrounding only a portion of said shaft;
   (b) a stacker head fixed to said gear and rotatable therewith;
   (c) first means for advancing one or more of said units onto said stacker head;
   (d) a driven first pinion engaging said gear for rotating said gear and said stacker head from a first position through a first angle to a second position, at which said one or more units are deposited onto fixed support means;
   (e) means to continue the rotation of said stacker head from said second position through a second angle to a third position;
   (f) a second pinion mounted for free rotation on said shaft having a hub with a portion overlapping the hub portion of said gear, said overlapping hub portions being coactive only through selective angles of rotation of said gear and said second pinion during a stacking cycle;
   (g) a ram having a rack engaging said second pinion and being engageable with said deposited one or more units to move them along said fixed support means, said ram being extended by said second pinion when said overlapping hub portions coact, as said stacker head moves from said second position to said third position;
   (h) control means for stopping and reversing the direction of rotation of said stacker head when it reaches said third position, and moving said stacker head from third position to said second position and to said first position, said overlapping hubs coacting to rotate said second pinion and retract said ram as said stacker moves from said second position to said first position; and
   (i) means for operating the apparatus cyclically.

2. The invention of claim 1 including:
   (a) an adjustable stop mounted to said stacker head engaging the first unit advancing onto said stacker head and limiting the number of units carried by said stacker head during any one cycle of operation; and
   (b) second means mounted adjacent to and actuatable in response to the rotation of said stacker head, whereby, as said stacker head rotates, said second means engages the next unit advancing behind the last unit carried by said stacker head, and said next unit is prevented from advancing onto said stacker head until it returns to the first position after completing a cycle and said second means is deactuated.

3. The invention of claim 2 wherein:
   (a) said first means includes a sprocket fixedly mounted to said shaft; and including
   (b) a driven endless chain surrounding said sprocket and engageable with said units.

4. The invention of claim 2 including:
   (a) a plurality of supports fixed adjacent said endless chain for engaging and supporting said units;
   (b) a pusher dog slidably mounted to said supports and having a portion projecting above the tops of said supports for engaging and moving a unit along said supports;
   (c) a slidable cam fixed to said pusher dog;
   (d) means to reciprocate said pusher dog and said cam whereby one or more units are moved along said support intermittently;
   (e) a first unit-engageable dog pivotally mounted to one of said supports and having a portion projecting above said support when said first unit is in a unit holding position;
   (f) a second unit-engageable dog pivotally mounted to said one of said supports and pivotally linked to said first unit-engageable dog, said second dog having a portion engageable with a unit resting on said support when said first unit is pivoted so that it does not engage and hold a unit;
   (g) a cam follower on said first unit-engageable dog adapted to engage said cam and maintain said first dog in a unit-holding position as long as said cam and cam follower are in contact; and
   (h) stops positioned adjacent each of said unit-engageable dogs to limit the pivotal movement of each said dog.

5. The invention of claim 4 including:
   (a) a plurality of spaced apart rollers mounted in proximity to said supports and having substantially coplanar horizontal axes angularly inclined with respect to said supports; and
   (b) drive means connected to each said roller for rotating them.

6. Apparatus for handling units of material adaptable for stacking comprising the combination:
   (a) a plurality of rollers having axes lying in a plane and arranged at an angle to the paths along which said units move onto said rollers;
   (b) means to rotate said rollers at such a speed that units advancing onto said rollers in one direction change direction of motion toward,
   (c) a plurality of fixed supports arranged adjacent said rollers onto which said units are discharged from said rollers;
   (d) a pusher dog slidably mounted to said supports and having a portion projecting above the top of said supports engageable with a unit for sliding the same along said supports;
   (e) a slidable cam fixed to said pusher dog;
   (f) means to reciprocate said pusher dog and said cam whereby said units move along said supports intermittently;
   (g) a first unit-engageable dog pivotally mounted to one of said supports and having a portion projecting above said support when said first unit is in a unit-holding position;
   (h) a second unit engageable dog pivotally mounted to said one of said supports and pivotally linked to said first unit engageable dog, said second dog having a portion engageable with a unit resting on said support when said first unit is pivoted so that it does not engage and hold a unit;
   (i) a cam follower on said first unit engageable dog adapted to engage said cam and maintain said first dog in unit holding position as long as said cam and cam follower are in contact;
   (j) stops positioned adjacent each of said unit-engageable dogs to limit the pivotal movement of each of said dogs;
   (k) a gear mounted to a shaft for free rotation about the axis of the shaft and having a hub with a portion surrounding only a portion of said shaft;
   (l) an endless chain movable alongside of said supports having elements engageable with said units for advancing the same along said supports and toward (m) a stacker head fixed to said gear and rotatable therewith;

(n) a driven first pinion engaging said gear for rotating said gear and said stacker head from a first position through a first angle to a second position at which said one or more units are deposited onto said fixed support means;

(o) an adjustable stop mounted to said stacker head that engages the first unit advancing onto said stacker head and limits the number of units carried by said stacker head in any one cycle;

(p) stop means mounted adjacent to, and actuatable in response to the rotation of, said stacker head, whereby, as said stacker head rotates, said stop means engages the next unit advancing behind the last unit carried by said stacker head and the next unit is prevented from advancing onto said stacker head until it returns to the first position after completing a cycle and said second means is deactuated;

(q) control means to continue the rotation of said stacker head from said second position through a second angle to a third position;

(r) a second pinion mounted for free rotation on said shaft and having a hub with a portion overlapping the hub portion of said gear, said overlapping hub portions being coactive only through selected angles of rotation of said gear and said second pinion;

(s) a ram having a rack engaging said second pinion and being engageable with said deposited one or more units to move them along said fixed support means, said ram being extended by said second pinion when said overlapping hub portions coact as said stacker head moves from said second position to said third position;

(t) control means for stopping and reversing the direction of rotation of said stacker head after it has reached said third position, and moving said stacker head from said third position, and moving said stacker head from said third position to said second position and to said first position, said overlapping hubs coacting to rotate said second pinion and retract said ram as said stacker head moves from said second position to said first position; and (u) means for operating the foregoing apparatus cyclically.

7. Apparatus for handling units of material adaptable for stacking comprising:

(a) a stacker head freely mounted to a shaft for rotation about the axis of the shaft;

(b) first means for advancing one or more of said units onto the stacker head when said stacker head is in a first position;

(c) second means for rotating said stacker head through a first angle from said first position to a second position at which said one or more units are deposited onto fixed support means, and through a second angle beyond said first angle to a third position;

(d) extensible third means mounted adjacent said second means for engaging and moving the deposited one or more units laterally on said support means;

(e) fourth means mounted freely on said shaft engaging said third means, and for extending and retracting said third means;

(f) fifth means mounted on said fourth means and acting cooperatively with said second means whereby, when said stacker head moves from said second position to said third position, said fourth means extends said third means;

(g) sixth means for reversing the direction of rotation of said second means whereby said stacker head pivots uninterruptedly from said third position to said second position and to said first position, with said fourth means cooperating with said second means to retract said third means as said stacker head moves from said second position to said first position; and (h) seventh means for repeating the foregoing cycle.

8. The invention of claim 7 including:

(a) adjustable eighth means mounted on said stacker head to limit the number of units that can be handled by said stacker head during a single stacking cycle.

9. The invention of claim 8 including:

(a) unit holding ninth means acting responsively to the rotation of said stacker head for engaging and preventing any more units, than the number of units selected, from advancing onto said stacker head during a single stacking cycle; and (b) tenth means for releasing said ninth means upon return of said stacker head to its first position, whereby other units advance onto said stacker head.

10. The invention of claim 7 wherein:

(a) said first means includes a driven endless chain.

11. The invention of claim 10 wherein:

(a) said second means includes a gear secured to said stacker head; and wherein (b) a driven first pinion engages said gear.

12. The invention of claim 10 wherein:

(a) said third means includes a pinion acting cooperatively with said gear; and wherein (b) said fourth means is a rack engaging said third means.

13. The invention of claim 12 wherein:

(a) said fourth means is a hub having a portion surrounding only a portion of said shaft; and wherein (b) said second means includes a hub having a portion that surrounds only a portion of said shaft and overlaps the hub portion of said fourth means, said overlapping hub portions being coactive only through selected angles of rotation of said second means, to rotate said third and fourth means intermittently during a stacking cycle.

14. The invention of claim 13 wherein:

(a) said sixth means includes a control console.

References Cited

UNITED STATES PATENTS

| | | | |
|---|---|---|---|
| 3,182,821 | 5/1965 | Parker | 214—7 |
| 3,279,664 | 10/1966 | Lynch | 214—7 |
| 3,303,943 | 2/1967 | Lambert et al. | 214—6 |
| 3,384,249 | 5/1968 | Greenberger | 214—6 |
| 3,390,789 | 7/1968 | Hill et al. | 214—1 |

GERALD M. FORLENZA, *Primary Examiner.*

R. J. SPAR, *Assistant Examiner.*

U.S. Cl. X.R.

198—20, 127; 214—1, 7